Figure 1:
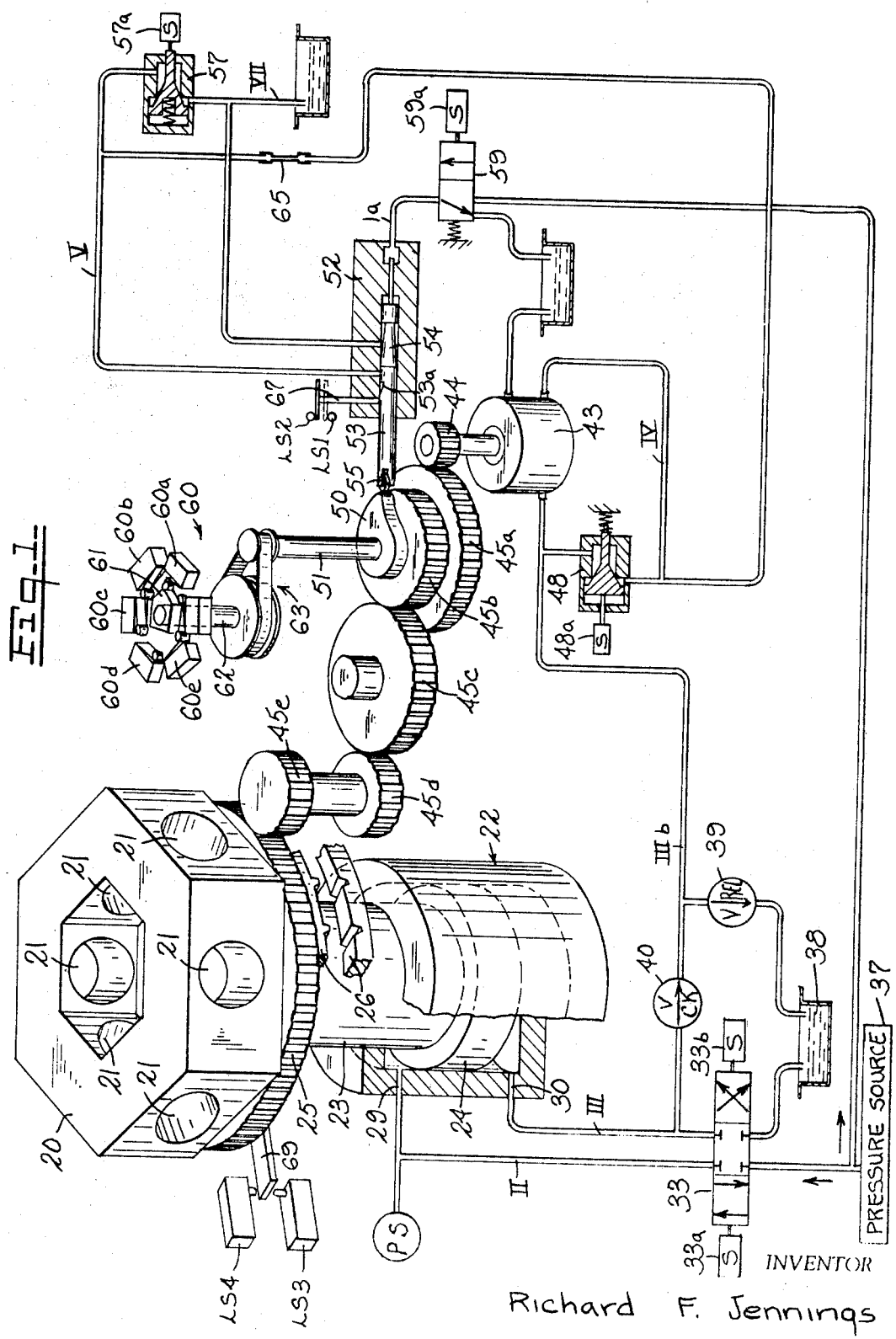

United States Patent

[11] 3,593,597

| [72] | Inventor | Richard F. Jennings<br>Springfield, Vt. |
|---|---|---|
| [21] | Appl. No. | 681,238 |
| [22] | Filed | Nov. 7, 1967 |
| [45] | Patented | July 20, 1971 |
| [73] | Assignee | Tertron, Inc.<br>Providence, R.I. |

[54] INDEXING MECHANISM
9 Claims, 2 Drawing Figs.

[52] U.S. Cl. .................................................... 74/818,
74/821, 74/826, 74/822
[51] Int. Cl. .................................................... B23q 17/18
[50] Field of Search .......................................... 82/36.1;
74/826, 814, 821, 818

[56] References Cited
UNITED STATES PATENTS
| 2,900,849 | 8/1959 | Hutchens et al. .............. | 74/826 |
| 2,979,971 | 4/1961 | Darash .......................... | 82/36.1 |
| 3,054,333 | 9/1962 | Brainard et al. .............. | 74/826 X |

*Primary Examiner*—Leonidas Vlachos
*Attorney*—Delio & Montgomery

ABSTRACT: An indexing mechanism for a machine tool, comprising toolholding means for supporting a plurality of tools mounted for rotation, the toolholding means including first and second face coupling means for positioning and preventing rotation of the toolholding means, hydraulic cylinder means for raising and lowering said toolholding means in order to separate and bring together said first and second face coupling means, said toolholding means being rotatable when said first and second face coupling means are separated, gear drive means for rotating said toolholding means and for indexing the same, hydraulic motor means for driving said gear drive means, and flow valve means having a spool responsive to cam means driven by said gear drive means for controlling said hydraulic motor means.

INDEXING MECHANISM

This invention relates to an indexing mechanism for a machine tool and more particularly to an indexing mechanism for controlling and indexing a turret of a turret lathe.

The prior art discloses many types of Geneva mechanisms for indexing a turret lathe. As is well known, a Geneva mechanism is a rather complicated mechanism, requiring precise adjustment for exactly positioning a movable member. With turret indexing mechanisms of the Geneva type, mechanical components are situated below the turret and are difficult to operate and to repair. In addition, the turret must stop at each successive face and accelerated and deceleration rates are fixed.

For these reasons, applicant has provided a new and improved turret indexing mechanism, in which all the mechanical components previously situated below the turret have been removed and an external gearing arrangement controlled by a hydraulic motor and associated controls, is utilized. With this invention, the turret can be made to skip-index and, in addition, the cam control can be shaped to attain different deceleration rates.

In view of the foregoing, it is an object of this invention to provide a new and improved turret indexing mechanism.

Another object of this invention is to provide a new and improved turret indexing mechanism using an external gear arrangement.

A further object of this invention is to provide a new and improved turret indexing mechanism having controls actuated in response to the movement of a portion of a flow valve.

Still other objects and advantages of this invention will in part be obvious and will in part be apparent from the specification.

The invention accordingly comprises the features of construction, combination of elements and arrangements of parts which will be exemplified in the construction hereinafter set forth and the scope of the invention will be indicated in the claims.

Figure 2:
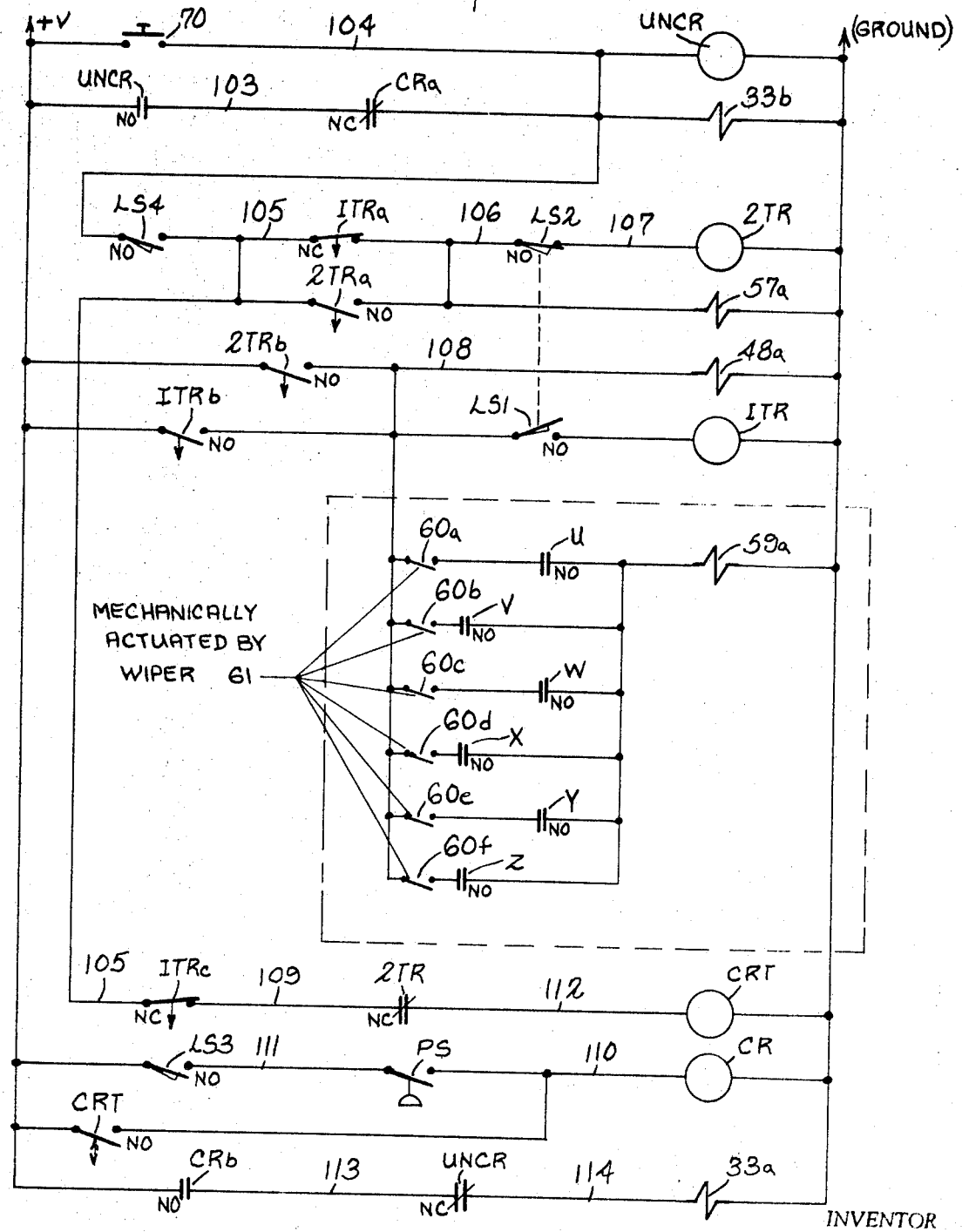

For a fuller understanding of the invention, reference is had to the following description, taken in connection with the accompanying drawings, in which FIG. 1 is a diagrammatic view of a turret indexing mechanism according to this invention; and FIG. 2 is a schematic diagram of the electrical control circuit of the invention.

Referring to FIG. 1, there is shown a toolholder, such as a turret, at 20 having a plurality of toolholder positions shown at 21. The toolholder 20 is supported by a hydraulic cylinder 22 through its piston shaft 23 which is coupled to a piston 24. Under the turret 20 and coupled to the shaft 23 is a gear 25 to which is coupled a portion of a face-type coupling shown at 26. The bottom of the coupling 26 is supported by a base of the turret lathe machine tool (not shown). The fluid for raising or lowering the piston 24 and thus the turret 20 to unclamp or permit through intakes 29 and 30 and through hydraulic pressure lines shown at II and III, respectively. In order to control the fluid to the cylinder 22, a solenoid value 33 is provided, having solenoids 33a and 33b to actuate the spool within the value 33 in either of two directions to either raise or lower the turret 20. Pressure is provided through line II, through a pressure source such a pump, providing fluid under pressure which is shown at 37. A sump 38 is provided and at 39 there are provided a pressure relief valve and a check valve shown connected in line IIIb at 40.

In order to index the turret 20 a hydraulic motor 43 is provided which drives a gear 44 which in turn drives a plurality of gears shown at 45a—45e. Gear 45e meshes with the gear 25 to index the turret 20 on command. To control the fluid to the motor, solenoid valve shown at 48 is provided, having a solenoid 48a, Also, to decelerate the motor at a predetermined time, a cam 50 is provided which is driven by the gear 44, the cam being coupled about a shaft shown at 51. The flow valve shown at 52 comprises a spool 53 with a tapered portion 54 and a cam follower 55 for following the cam 50.

In addition to the flow valve 52 and the control valve 48, there is provided a further solenoid control valve shown at 57 having a solenoid shown at 57a. This flow valve also controls the flow the fluid to operate the motor 43.

As a further feature of this invention, there is provided a solenoid valve shown at 59 having a solenoid shown at 59a. This solenoid valve controls the flow of pressure from the source 37 to cause the spool 53 to move to follow the cam 50. This particular valve is used in the system as a part of a turret timer option and operates in conjunction with a turret timer generally shown at 60. This comprises a plurality of switches shown at 60a—60f, which correspond to the number of turret faces. These switches are actuated by a camlike member 61 which is affixed to a shaft 62 driven by a pulley arrangement shown at 63 from the shaft 51. The purpose of this turret timer option is to provide a means for skipping particular toolholder positions at maximum velocity, as well as for use with controls requiring turret face identification.

In order to set the maximum velocity of the hydraulic motor 43, there is provided a fixed orifice shown at 65 which limits the flow of fluid to the motor 43.

As an additional feature of this invention, limit switches LS1 and LS2 are provided which are selectively actuated in response to the movement of the spool 53. As may be seen, the spool 53 has an indentation or depression shown at 53a which permits either of the switches LS1 or LS2 to make contact, depending upon the position of the spool. A contactor is generally shown at 67. An explanation of the operation of the switches LS1 and LS2 will be given in conjunction with the description of the electrical portion of the mechanism.

In addition, electrical control switches LS3 and LS4 are provided, which are actuated by a member shown at 69 which moves with the turret 20. The switch LS3 will be actuated when the turret is in the clamped position and switch LS4 will be actuated when the turret is in the unclamped position. Another switch, shown as PS, is coupled to line II and is used in conjunction with the electrical circuitry to provide a signal to the machine control system of this invention.

Referring now to FIG. 2 together with FIG. 1, the operation of the system is as follows. Initially, all relays and all solenoids are deenergized. The contacts with two parallel lines with slash lines therebetween indicate a normally closed contact. In addition, this circuit discloses two timers of the type commonly available, which control contacts such that the contacts will close when the timers are energized or open, depending upon the contact and in which, when the timers such as timer 1TR and 2TR are deenergized, there is a time delay for the respective contacts to then open or close, depending upon whether or not the contacts are normally open or normally closed. As shown in the drawing, the contact 1TRa indicates a normally closed contact, whereas 1TRb indicates a normally open contact. Contact 1TRc is also a normally closed contact.

In the electrical diagram, each of the lines is numbered beginning with 103 through 114, the solenoids 33a, 33b, 57a,48a and 59a,previously mentioned, being in the circuit as shown. The circle UNCR indicates a relay coil, as does the circle representing CR and CRT. These operate the contacts shown at UNCR and CR, respectively, in the electrical diagram. As mentioned previously, the switch PS is actuated in accordance with pressure in fluid line II. To simplify the explanation of the circuitry, the term "NO" is used to indicate a normally open switch and the term "NC" is used to indicate a normally closed switch.

To initiate the operation of this system, the start contact 70 in the electrical circuit is depressed momentarily. Current then flows through line 104, energizing relay UNCR and solenoid 33b, which are maintained by the closing of contact UNCR through line 103. The energizing of the solenoid 33b supplies hydraulic pressure to line III and thus causes the turret 20 to become elevated and close normally open switch LS4. The closing of switch LS4 allows current to flow through closed contact 1TRa, through lines 106 and 17 to energize the timer 2TR and solenoid 57a, which are maintained through contact 2TRa which closes upon energization of the timer 2TR. At the same time, solenoid 48a is energized through the closing of timer contact 2TRb, As both solenoids 57a and 48a are energized, hydraulic fluid flows through lines III, IIIb, IV, V and VII and the hydraulic motor 43 starts to rotate at mass acceleration until maximum velocity is achieved, determined by the flow of fluid through the restriction of the fixed orifice 65. At this time, the coding circuit having contacts 60a—60f, previously mentioned, driven by the shaft 51, comes into play. Switch contacts shown at U-Z are provided which are controlled from a command control system (not shown) or may be manually controlled in a well-known manner. If any of the normally open switches U-Z are closed, the respective switch 60a—60f in the same circuit line will be active and, upon being actuated by member 61, will control the operation of the system.

After the hexagonal turret 20 has rotated 20°, the next face switch is interrogated. When it is actuated and therefore closes, and if it is active from control command (contact U) the solenoid 59a will be energized, applying pressure to line 1a which will drive the follower out against the cam which has a high circular arc extending 120°, representing 20° at the turret. Thereafter, the shape of the follower spool 53 causes the opening of the flow valve to tank line VII and, during the same motion, opens switch LS2. As the contactor 67 falls within the notch or indent 53a, the timer 2TR deenergizes. As LS2 is opened, LS1 is closed, which energizes timer 1TR and is maintained through its own contact. Thereafter, the contacts of 2TR time-open thus deenergizing solenoid 57a and opening 2TRb in line 108. The hydraulic motor 43 continues to rotate, due to the flow through control valve and decelerates due to the spool taper 54. Just before top dead center of the cam, LS1 is opened, deenergizing 1TR. The timer delay allows the cam follower to position at top dead center by diminishing hydraulic oil flow to zero velocity. Thereafter, 1TRb contact opens, deenergizing solenoids 59a and 48a, permitting a hydraulic pressure balance around the motor in lines IIIa and IV. This allows the turret to lower into the face coupling for precise location without counterforces from the tor. In addition, the 1TRc contact in line 109 closes, to energize relay CRT which closes CRT contact in line 110, energizing relay CR. This opens contact CRa, deenergizing relay UNCR and solenoid 33b, which closes contact CRb in lines 113 and 114, energizing solenoid 33a which removes hydraulic pressure from line III and applies it to line II to lower the turret. A check valve in hydraulic line IIIb eliminates back pressure to the motor when solenoid 33a is energized. The turret is lowered, LS4 is opened, but CR is maintained through the time contact of CRT until the turret is down in place, thus actuating LS3 and pressure is applied, closing switch PS, which keeps solenoid 33a energized. Affirmative signals from LS3 and the PS switch allow the machinery cycle to commence. If these two conditions are not achieved, CR will deenergize and a contact could be provided to signal the machine control system.

In the alternative, if the next face switch, such as switch 60b, is not active the solenoid 59a will not be energized and the turret will index continuously at maximum velocity, determined by the fixed orifice 65. If any face code switch is actuated, the turret will decelerate to a stop, as previously described.

If it is desired that a noncoded operation be utilized for indexing the turret 20, the coding circuit comprising switches 60a—60f, solenoid 59a and contacts U,V,W,X,Y and Z may be removed. With this arrangement, after the cam has rotated 120° from the starting point, the follower 55 would ride down the slope opening the flow valve to the tank in line VII and, during the same motion, open LS2 which deenergizes 2TR. The operation is then identical with the operation described for the coded system.

It will thus be seen that the objects set forth above, among those made apparent from the preceding description, are efficiently attained and since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

I claim:

1. An indexing mechanism for a machine tool having a toolholder adapted to hold a plurality of angularly spaced tools, said toolholder including first and second face coupling means for positioning and preventing rotation of the toolholder, hydraulic cylinder means for raising and lowering said toolholder in order to separate and bring together said first and second face coupling means, said toolholder being rotatable to position a selected tool when said first and second face coupling means are separated; gear drive means for rotating said toolholder when said face coupling means are disengaged, hydraulic motor means for driving said gear drive means, cam means driven by said gear drive means and flow valve means having a spool responsive to said cam means for controlling fluid flow to said hydraulic motor, means for selecting an angular position of said toolholder, means responsive to said selecting means for producing continuous rotation of said motor to drive said toolholder toward the selected position past any intermediate position, and means responsive to said toolholder approaching said selected position for positioning said spool to be engaged by said cam means said cam means being constructed and arranged to continuously control said flow valve means upon said positioning thereof to continuously decrease flow of fluid to said motor to zero.

2. An indexing mechanism according to claim 1, in which electrical switch means are provided responsive to the position of the spool of said flow valve, said electrical switches controlling the position of said cam means.

3. An indexing mechanism according to claim 1, and including a pair of electrical switches responsive to the coupled and uncoupled position of the toolholder means, said electrical switches controlling the operation of said motor means.

4. An indexing mechanism according to claim 1, in which pressure is provided to one side of spool to cause it to follow said cam means.

5. An indexing mechanism for a machine tool, comprising toolholder means for supporting a plurality of tools mounted for rotation, said toolholder including first and second face coupling means for positioning and clamping said toolholder, means for selecting an angular position of said toolholder, hydraulic cylinder means for raising and lowering said toolholder in order to separate and bring together said face coupling means, said toolholder being rotatable when said first and second face coupling means are separated, gear drive means for rotating said toolholder, a hydraulic motor for driving said gear drive means, cam means driven by said gear driven means, flow valve means having a spool with a cam follower said cam means, first means for initiating the flow of fluid into said hydraulic cylinder to disengage said face coupling means and raise said toolholder, means response to the raised position of said toolholder for initiating the operation of hydraulic motor means to rotate said toolholder means and move said cam means, means for positioning said spool to be operated on by said cam as said toolholder approaches a selected position said spool means being responsive to said cam means upon said positioning thereof to operate said flow valve means and continuously decelerate said motor means to a stop, and means responsive to the position of said spool means and movement thereof by said cam means on said cam follower to cause said cylinder means to lower said toolholder into a clamped position.

6. An indexing mechanism according to claim 5, including time delay means responsive to the position of said spool for allowing the cam follower and spool to position at substantially top dead center of the cam.

7. An indexing mechanism according to claim 5, including time delay means responsive to the position of the spool for allowing the toolholder means to lower into the face coupling means without counterforces from the motor by permitting a hydraulic pressure balance around the motor.

8. The mechanism of claim 5 wherein said toolholder has a plurality of tool face holder positions, a plurality of face switches corresponding in number to the toolholder face positions, and means responsive to said face switches for skipping one of said toolholder face positions depending on the condition of one of said switches.

9. An indexing mechanism according to claim 8, including means for indexing to a stop position depending on the actuation of one of said switches.

PO-1050
(5/69)

UNITED STATES PATENT OFFICE
CERTIFICATE OF CORRECTION

Patent No. 3,593,597      Dated July 20, 1971

Inventor(s) Richard F. Jennings

It is certified that error appears in the above-identified patent and that said Letters Patent are hereby corrected as shown below:

Column 1, line 14, "accelerated" should read "acceleration"; column 1, line 58, after "permit", insert --the turret to be clamped by the coupling 26, enters the piston--; column 1, line 56, after "shown" insert -- ) --. Column 2, line 6, "the flow the fluid" should read "the flow of fluid"; column 2, line 44, after "lines" insert --indicate an open contact and those with two parallel lines--. Column 3, line 25, before "follower" insert --cam--; column 3, line 42, "tor" should read "motor". Column 4, line 61, "driven" should read "drive"; column 4, line 62, before "said cam means" insert --for following--.

Signed and sealed this 22nd day of February 1972.

(SEAL)
Attest:

EDWARD M. FLETCHER, JR.      ROBERT GOTTSCHALK
Attesting Officer      Commissioner of Patents